United States Patent Office 3,244,677
Patented Apr. 5, 1966

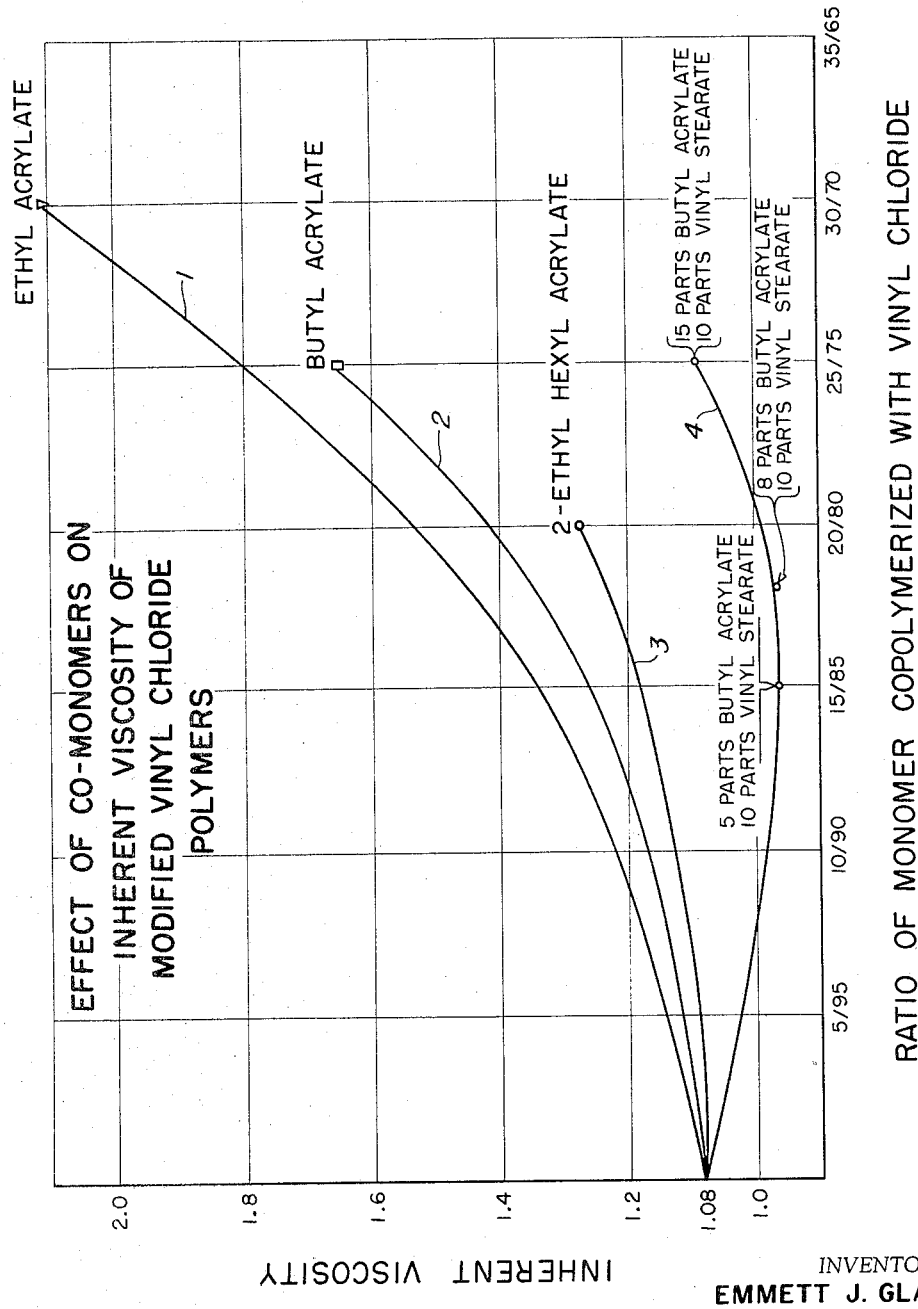

3,244,677
INTERNALLY PLASTICIZED VINYL POLYMERS
Emmett J. Glazer, Stow, Ohio, assignor to The Goodyear Tire & Rubber Company, Akron, Ohio, a corporation of Ohio
Filed Aug. 17, 1962, Ser. No. 217,718
2 Claims. (Cl. 260—80.5)

This invention relates to internally plasticized vinyl resins and more particularly to vinyl terpolymers having improved properties, particularly with regard to processibility, impact resistance, clarity and uniformity of composition.

Vinyl resins, particularly polyvinyl chloride, are useful in the manufacture of many articles, especially when plasticized. The addition of a plasticizer, such as dioctyl phthalate, has one drawback in that plasticizers of this nature tend to bleed from the stock. Resins plasticized in this manner are not useful in the field of adhesive coatings nor in the field of food packaging.

Since vinyl chloride polymers have excellent outdoor weathering properties, they are particularly desirable for use in the manufacture of latex paints. Therefore, it is most desirable to find a way of plasticizing the resin in a way that the plasticizer does not migrate.

It has now been discovered that internally plasticized vinyl chloride polymers may be made in a wide range of compositions in a simple, efficient, effective and economical suspension recipe.

In accordance with the present invention, attractive calendered films may now be made without the addition of external plasticizers. Films made from the polymers of this invention exhibit excellent low temperature flexibility, excellent fold and abrasion resistance, good tensile strength, elongation and modulus properties, excellent clarity, and when exposed in a Weatherometer for 1,000 hours substantially no loss of the physical properties. The resins of this invention withstand pigmentation with such pigments as titanium dioxide, possess excellent notched Izod impact strength and are easily molded into thick sections of tough, uniquely transparent and light-colored structures.

In the production of a desirable film-forming coating composition or a self-supporting transparent film for wrapping purposes made from polyvinyl chloride, it has been observed that a desirable modifying monomer is an acrylate, particularly an alkyl ester of acrylic acid in which the alkyl group contains a chain of from 2–8 carbon atoms. The addition of an acrylate in forming the colpolymer produces an unusually large increase in the inherent viscosity. The magnitude of this increase is nearly proportional to the mol percent of acrylate present. For a given weight percent of acrylate monomer, the effect of, for example, ethyl acrylate, is greater than that of butyl acrylate, which in turn is greater than that of 2-ethylhexyl acrylate in raising the inherent viscosity. It is also observed that the polymerization rate of vinyl chloride is slower than the polymerization rate for the acrylates and consequently it is difficult to control the monomer ratio desired in making any particular copolymer. It has now been discovered that the use of vinyl stearate as a third monomer functions not only as a means of controlling the rate of polymerization between these two monomers, but also functions as a unique inherent viscosity regulator as well as an internal plasticizer which contributes the desirable lubricity to the finished polymer without the tendency to migrate from the polymer.

FIG. 1 of the drawing shows the effect of co-monomers on the inherent viscosity of vinyl chloride polymers modified with various acrylates and vinyl stearate. The top three curves 1, 2 and 3 of FIG. 1 show how the inherent viscosities of various acrylate copolymers increase. When enough of these co-monomers are added to give the desired plasticizing action in vinyl chloride copolymers, processing difficulties are encountered above an inherent viscosity of 1.3. The bottom curve 4, on the other hand, shows that when the acrylate component is diluted with vinyl stearate, the inherent viscosity values of the terpolymer drop from the value of 1.08 possessed by the homopolymer prepared under the same polymerization conditions. After passing through a minimum value at about an 83/7/10 vinyl chloride/butyl acrylate/vinyl stearate composition, the inherent viscosity of the terpolymer increases until at one of the preferred compositions of 75/15/10 vinyl chloride/butyl acrylate/vinyl stearate the value is finally back to that of the homopolymer. The 25/75 butyl acrylate/vinyl chloride copolymer, on the other hand, possesses an inherent viscosity of 1.65. Thus, the use of vinyl stearate in copolymers containing high percents of acrylate with vinyl chloride produces an unexpected advantage in permitting the control of the inherent viscosity of these acrylate compositions within processible limits without the necessity of reverting to the use of excessively high polymerization temperatures. The 75/15/10 vinyl chloride/butyl acrylate/vinyl stearate terpolymer possesses the unique advantage of processing at an even lower temperature than the homopolymer due to the regulating effect of the vinyl stearate on the inherent viscosity and also due to the lubricating action of the vinyl stearate component in the polymer. In this regard, the polymers shown in FIG. 1 of the drawing were made in accordance with the following recipe:

Ingredients: Parts (by weight)
    Monomers _____ 100
    Methocel (65 HG–50) _____ 0.2
    Lauroyl peroxide _____ 0.3
    Distilled water _____ 200

Polymerization temperature—122° F.
    Time—10 to 20 hours.
    Agitation—530 to 600 r.p.m.
    Agitator—6" propeller with 2 full-length baffles.

Referring to the products shown by curve 4 in FIG. 1 of the drawing, a terpolymer classified as a soft composition was made using the same formula noted above, wherein 75 parts of vinyl chloride, 15 parts of n-butyl acrylate and 10 parts of vinyl stearate were reacted for 12 to 14½ hours, producing a yield of between 75 and 80%. A terpolymer of an intermediate composition was also made under the same conditions as defined above with the exception that 82 parts of vinyl chloride was reacted with 8 parts of n-butyl acrylate and 10 parts of vinyl stearate. A third terpolymer of a hard composition was made in the same way noted above with the exception that 85 parts of vinyl chloride was reacted with 5 parts of butyl acrylate and 10 parts of vinyl stearate.

A product not shown in FIG. 1 was also made wherein the composition was 95 parts vinyl chloride, 3 parts 2-ethylhexyl acrylate and 2 parts vinyl stearate. The recipe used was as follows:

Ingredients: Parts (by weight)
    Monomers _____ 100
    Methocel (65 HG–50) _____ 0.25–0.50
    Lauroyl peroxide _____ 0.2–0.3
    Distilled water _____ 200

Polymerization temperature—160° F.
    Time—2½ to 4 hours.
    Agitation—530 to 600 r.p.m.
    Agitator—6" propeller with 2 full-length baffles.

The soft composition noted above was formed in an uncompounded condition into a molded sheet of a thickness of 0.01" and found to have a tensile strength of 2600 pounds p.s.i. and resistance to abrasion of 0.0094 when molded at a temperature of 300° F. for 10 minutes, and a tensile strength of 3200 pounds p.s.i. with abrasion resistance of 0.0127 when molded at a temperature of 350° F. for 10 minutes.

The resistance to abrasion is measured in grams lost per 1000 cycles using standard ASTM abrasion test procedure. The 0.01" film when molded at 300° F. for 10 minutes stretched 2% when stressed at 467 pounds p.s.i. and when molded at 350° F. for 10 minutes stretched 2% when stressed at 653 pounds p.s.i. The film broke at 350% elongation after being molded at 300° F. for 10 minutes and broke at 400% elongation after being molded at 350° F. for 10 minutes.

The hard composition when molded into a sheet 0.01" in thickness at 300° F. for 10 minutes stretched 2% when stressed at 3194 pounds p.s.i., resisted abrasion at 0.0095 and exhibited an Izod impact notched value of 4.5 ft. lbs./in. and had a heat distortion of 107° F. A similar vinyl chloride/butyl acrylate copolymer showed a notched Izod impact value of only 0.7 ft. lbs./in.

When the soft composition above is compounded with 3.5 parts of barium cadmium stearate per 100 parts of resin and then calendered into a film 0.02" thick, a resistance to abrasion of 0.0105, a tensile strength of 2700 pounds p.s.i., a 2% stretch at 195 pounds p.s.i. loading, and a 260% elongation at break are developed. The hard composition above compounded in the same manner had resistance to abrasion of 0.0120, tensile strength of 3400 pounds p.s.i., a 2% stretch when loaded at 2800 pounds p.s.i., and a 140% elongation at break.

The soft composition above in an uncompounded condition had a tack temperature of 145° F., discolored within 35 minutes when heated at 225° F. without stabilizer and discolored in 24 minutes when heated at 310° F. with stabilizer, the stabilizer being the same as indicated above.

The calendered film indicated above exhibited no strength at 211° F. in the calendered direction and no strength at 183° F. when measured 90° to the calendered direction. A maximum dimension change of +¾" in a 3¾" sample appeared at 120° F. in the calendered direction and +1½" appeared at 105° F. at 90° to the calendered direction.

The intermediate composition had a tack temperature of 275° F., discolored after 45 minutes at 225° F. without stabilizer, lost all strength at 264° F. in the calendered direction and lost all strength at 232° F. when measured at 90° to the calendered direction. A maximum dimension change of +⅞" measured in the calendered direction at 110° F. and +1⅛" when measured at 90° to the calendered direction at 110° F. was observed. The hard composition above had a tack temperature of 280° F., showed no discoloration after 100 minutes at 225° F. without stabilizer and discolored after 25 minutes at 310° F. with the stabilizers noted above. The hard composition when calendered as a film lost all strength at 294° F. in the calendered direction and at 267° F. when measured at 90° to the calendered direction and had a maximum dimension change of +⅛" at 130° F. in the calendered direction and +1⅛" when measured at 90° to the calendered direction at 115° F. Molded bars up to ½" in thickness were exceptionally transparent when made in accordance with the composition represented by curve 4.

The interpolymers of this invention having the properties indicated above may be made by polymerizing a mixture of monomeric materials comprising 45–98% by weight of vinyl chloride, from 1–45% by weight of vinyl stearate, and from 1–54% by weight of an alkyl ester of acrylic acid in which the alkyl group contains a chain of from 2–8 carbon atoms. Suitable acrylates that find desirable application as a modifying agent together with vinyl stearate for vinyl chloride are methyl acrylate, ethyl acrylate, propyl acrylate, n-butyl acrylate, n-amyl acrylate, n-hexyl acrylate, isohexyl acrylates, n-heptyl acrylate, isoheptyl acrylates, capryl acrylate, (1-methyl-heptyl acrylate), n-octyl acrylate, 2-ethylhexyl acrylate, isooctyl acrylates such as 6-methyl-heptyl acrylate, n-nonyl acrylate, isononyl acrylates such as 3,5,5-trimethylhexyl acrylate, n-decyl acrylate, lauryl acrylate and others.

The preferred acrylate is butyl acrylate, and preferred polymer compositions involve the polymerization of 100 parts of vinyl chloride with 20 parts of butyl acrylate and 13.3 parts of vinyl stearate.

Another preferred composition involves the polymerization of a mixture comprising 100 parts of vinyl chloride, 5.9 parts of butyl acrylate, and 11.8 parts of vinyl stearate. Another preferred terpolymer is made by polymerizing a mixture comprising 100 parts of vinyl chloride, 9.8 parts of butyl acrylate, and 12.2 parts of vinyl stearate. Thus, the preferred ratio of butyl acrylate to vinyl stearate may range from 33.3 to 60.0 per 100 parts of vinyl chloride monomer. However, ratios of acrylate to vinyl stearate may range from 80/20 to 20/80 per 100 parts of vinyl chloride monomer.

Vinyl stearate is the preferred monomer in modifying the vinyl chloride/acrylate copolymer in view of its unique properties of contributing lubricity to the finished product and acting as a control in bringing about the copolymerization of the acrylate and vinyl chloride monomers. However, the vinyl esters of palmitic, arachidic, behenic, caproic, lauric and myristic acids may be considered as functioning in substantially an equivalent manner observed for vinyl ester of stearic acid.

Vinyl chloride is the monomer preferred in producing the terpolymer of this invention; however, other vinyl type monomers having substantially the equivalent properties and function of vinyl chloride in the production of the terpolymer of this invention might also include vinylidene chloride, acrylonitrile, vinylidene fluoride, vinyl fluoride, styrene, and vinylpyridine. In addition to the acrylates set forth above, the hydroxy alkyl esters of acrylic acid are of interest in the present invention, particularly 2-hydroxyethyl acrylate, 1-chloro-2-hydroxy-ethyl acrylate, 3-hydroxypropyl acrylate, 2,3-dihydroxy-propyl acrylate (glyceryl acrylate), 2-methoxy-3-hydroxy propyl acrylate, 2-hydroxy-butyl acrylate, 3-hydroxy-butyl acrylate, 3,4-dihydroxy-butyl acrylate, 2-methoxy-3,4-dihydroxy-butyl acrylate, 5-hydroxy-amyl acrylate, 6-hydroxy-hexyl acrylate, 2-ethyl-6-hydroxyhexyl acrylate, 7-hydroxy-heptyl acrylate, 1-methyl-7-hydroxy-heptyl acrylate, 6-hydroxy-octyl acrylate, 3,5,5-trimethyl-6-hydroxy-hexyl acrylate, and 10-hydroxydecyl acrylate.

The polymerization of the new terpolymer of the present invention may be carried out in any conventional manner, although polymerization in an aqueous suspension system is preferred. However, when a latex of the terpolymer is desired, the polymerization may be carried out in an aqueous emulsion. Polymerization may also be carried out in solution in a suitable solvent for the monomer, such as acetone, wherein the polymer precipitates from the solvent in granular form.

Whatever method of polymerization is employed, any catalyst commonly employed may be used, including actinic radiation, peroxygen compounds such as hydrogen peroxide, cumene hydroperoxide and persulfates and percarbonates. These catalysts may be activated when used in combination with a reducing substance such as a heavy metal salt. Any of the usual emulsifying agents may be employed including ordinary soaps, such as the alkali metals of fatty acids including sodium oleate, and the detergents generally known as the sulfates and sulfonates, such as sodium lauryl sulfate and sodium isopropyl naphthalene sulfonate. Suspending agents of various types may be used including gelatin, polyvinyl alcohol, cellulose derivatives, lecithin, etc.

Polymerization may be carried out in the presence of air, but faster reactions are observed in the absence of oxygen at temperatures ranging from −25° C. to 110° C., although preferred temperatures range from about 5° C. to about 80° C.

The terpolymers of this invention may be used in making transparent film for food packaging and as film-forming ingredients in latex paints.

While certain representative embodiments and details have been shown for the purpose of illustrating the invention, it will be apparent to those skilled in this art that various changes and modifications may be made therein without departing from the spirit or scope of the invention.

What is claimed is:

1. An interpolymer made by polymerizing a mixture of 100 parts by weight of monomeric materials in the presence of each other and in the presence of a peroxygen catalyst, said mixture comprising from 70 to 95 parts of vinyl chloride, 3 to 15 parts of an acrylate selected from the group consisting of n-butyl acrylate and 2-ethylhexyl acrylate, and 2 to 10 parts of vinyl stearate.

2. An interpolymer made by polymerizing a mixture of 100 parts by weight of monomeric materials in the presence of each other and in the presence of a peroxygen catalyst, said mixture being selected from the group consisting of:
   (a) about 75 parts of vinyl chloride, about 15 parts of n-butyl acrylate and about 10 parts of vinyl stearate;
   (b) about 82 parts of vinyl chloride, about 8 parts of n-butyl acrylate and about 10 parts of vinyl stearate;
   (c) about 85 parts of vinyl chloride, about 5 parts of butyl acrylate and about 10 parts of vinyl stearate; and
   (d) about 95 parts of vinyl chloride, about 3 parts of 2-ethylhexyl acrylate and about 2 parts of vinyl stearate.

References Cited by the Examiner

UNITED STATES PATENTS

| | | | |
|---|---|---|---|
| 2,118,864 | 5/1938 | Reppe et al. | 260—80.5 |
| 2,462,422 | 2/1949 | Plambeck | 260—80.5 |
| 2,605,256 | 7/1952 | Wolf | 260—80.5 |
| 3,018,274 | 1/1962 | Buselli et al. | 260—80.5 |
| 3,068,211 | 12/1962 | Deanin | 260—80.5 |

JOSEPH L. SCHOFER, *Primary Examiner.*

WILLIAM SHORT, *Examiner.*